United States Patent [19]

Sugaya et al.

[11] Patent Number: 5,300,228

[45] Date of Patent: Apr. 5, 1994

[54] METHOD FOR SEPARATING AND RECOVERING AN ACID

[75] Inventors: Yoshio Sugaya; Misaki Kanazawa; Haruhisa Miyake, all of Yokohama, Japan

[73] Assignee: Asahi Glass Company Ltd., Tokyo, Japan

[21] Appl. No.: 894,642

[22] Filed: Jun. 5, 1992

[30] Foreign Application Priority Data

Jun. 7, 1991 [JP] Japan ................................. 3-163719
Jul. 12, 1991 [JP] Japan ................................. 3-198651

[51] Int. Cl.$^5$ ............................................. B01D 61/24
[52] U.S. Cl. ...................................... 210/638; 210/644
[58] Field of Search ........................ 210/638, 644, 634

[56] References Cited

U.S. PATENT DOCUMENTS 4,476,025 10/1984 Chum et al. .
4,765,905 8/1988 Kitamura et al. ................ 210/644 X

OTHER PUBLICATIONS

Patent Abstracts of Japan, vol. 5, No. 8, (C-39), Jan. 20, 1981, & JP-A-55 137 008, Oct. 25, 1980, Kurokawa Fumio, et al., "Diffusion Dialysis".

*Primary Examiner*—Frank Spear
*Attorney, Agent, or Firm*—Oblon, Spivak, McClelland, Maier & Neustadt

[57] ABSTRACT

A method for separating and recovering an acid, which comprises contacting to one side of a diffusion dialysis membrane an acid solution containing an acid having an acid radical with a formula weight of at most 200 and impurities and to the other side of the membrane water or a dilute acid solution, to separate and recover the acid in the solution, wherein the diffusion dialysis membrane comprises a cation exchange membrane having certain specific properties or comprises a main layer of an anion exchanger and a surface layer of the cation exchange membrane having certain specific properties formed on the main layer at the side of which is contact with the acid solution.

9 Claims, No Drawings

METHOD FOR SEPARATING AND RECOVERING AN ACID

The present invention relates to a method for efficiently and selectively recovering or removing an acid from an acid-containing solution by diffusion dialysis employing an ion exchange membrane.

So-called diffusion dialysis employing anion exchange membranes for recovering an acid and separating metal ions from a solution containing such an acid and metal by utilizing a difference in the concentration as a driving force, is already used in many fields. Such acid diffusion dialysis membranes have been reported in many literatures and patents. Among them, the most practical and useful one is an amino-modified (or a quaternary pyridinium-modified) anion exchange membrane made of a chloromethylstyrene (or vinylpyridine)-divinylbenzene copolymer. However, the recovery of an acid from e.g. a hydrochloric acid solution containing impurities such as trivalent iron ions by means of such an anion exchange membrane, has a drawback such that the permeability or the selective permeability of an acid tends to substantially deteriorate in the course of a diffusion dialysis.

It is an object of the present invention to solve such a drawback and to present a diffusion dialytic method whereby an acid can be recovered from an acid solution containing metal complex anions such as iron ions in hydrochloric acid. It is another object of the present invention to provide a method for recovering an acid by diffusion analysis, which is useful for an environmental protection and conservation of resources by its application to treatment of a waste liquid or a process solution with respect to which no merit for recovery has heretofore been recognized.

The present invention provides a method for separating and recovering an acid, which comprises contacting to one side of a diffusion dialysis membrane an acid solution containing an acid having an acid radical with a formula weight of at most 200, preferably at most 100, and impurities and to the other side of the membrane water or a dilute acid solution, to selectively permeate the acid, wherein the diffusion dialysis membrane comprises a cation exchange membrane having certain specific properties or comprises a main layer of an anionic exchanger and a surface layer of the above cation exchange membrane having certain specific properties formed on the main layer at the side which is in contact with the acid solution.

The diffusion dialysis membrane to be used in the present invention consists essentially of a cation exchange membrane having specific physical properties or an anion exchange membrane having such a cation exchange membrane on its surface. By using such a membrane for an acid diffusion dialytic process, the stability in the selective permeability of an acid can be accomplished. This is based on a new discovery or a concept which has not been found in the conventional acid diffusion dialysis employing a single anion exchange membrane.

The present inventors have conducted extensive researches with respect to diffusion dialysis membranes excellent in the selectivity and permeability and have found a phenomenon that in diffusion dialysis of an acid solution containing certain specific impurities, the permeability and selectivity of an acid substantially decrease with anion exchange membranes excellent in the selective permeability of hydrogen ions/cations (other than hydrogen ions). From an investigation of impurities which hinder the selective permeability of the anion exchange membranes, such impurities were found to be polyacids and metallic complex anions. As a result, the present inventors have found a practical method for recovering an acid by means of a cation exchange membrane having certain specific properties from an acid solution containing such anions.

As such a cation exchange membrane, a membrane containing sulfonic acid groups in an amount of from 0.5 to 4.5 meq/g dry resin, preferably from 0.8 to 3 meq/g dry resin and having an electrical resistance of at most $0.5\Omega\cdot cm^2$, preferably at most $0.2\Omega\cdot cm^2$, as measured in the acid solution containing the acid to be recovered at a concentration of 0.5 mol/l, is used.

In the present invention, the electrical resistance in the acid solution is represented by an alternate current resistance in an aqueous solution of the acid to be recovered at a concentration of 0.5 mol/l. With a cation exchange membrane having an electrical resistance of higher than $0.5\Omega\cdot cm^2$, the permeation rate of the acid tends to be low, and such is not practical for the recovery of the acid even if the selectivity is high. On the other hand, if the electrical resistance is too low, the selectivity from the impurities tends to be low. Therefore, the electrical resistance is preferably at least $0.001\Omega\cdot cm^2$.

The cation exchange membrane to be used in the present invention may be reinforced by a porous substrate to impart dimensional stability or practical strength for e.g. handling efficiency. Such a porous substrate may be embedded in a layer of an ion exchanger to form a reinforced cation exchange membrane. Otherwise, for the purpose of increasing the permeability of an acid, a thin layer of a cation exchanger and a porous substrate layer may be laminated to form a double layer cation exchange membrane. As such a porous substrate layer, a fine porous membrane having a pore size of from 0.01 to 10 μm, a porosity of from 30 to 90% and a membrane thickness of from 10 to 300 μm, is preferred, which may be made of a polyolefin such as polyethylene or polypropylene, a fluorine-containing polymer such as a polyvinylidene fluoride, polytetrafluoroethylene or a polytetrafluoroethylene-ethylene copolymer, or an engineering plastic such as polysulfone, polyimide or polyarylate.

Such a cation exchange membrane can be used alone as the acid diffusion dialysis membrane. However, it has been found that when cations other than hydrogen ions are present as impurities in the acid solution, the selectivity for the acid tends to be inadequate.

Thus, the present invention provides a double layer membrane having a thin layer of a cation exchanger formed on the surface of an anion exchange membrane, as an acid diffusion dialysis membrane which is excellent in the selectivity, permeability and performance stability in any system where impurities are of a cation type or an anion type having a large mass such as isopolyacids and metal complex anions or in a system where cations and anions having a large mass are coexistent.

As the cation exchange membrane having the above specific properties, a cast polymer membrane, a graft polymer membrane, a plasma polymer membrane, a melt-molded membrane or a cast membrane using a polymer of a styrene type, a perfluorocarbon type or an engineering plastic type such as polysulfone, may be employed.

As a specific example of such a cation exchange membrane, a cation exchange made of a copolymer of $CF_2=CFO(CF_2CFCF_3O)_n(CF_2)_mSO_2F$ wherein n is from 0 to 2, and m is from 0 to 4, provided that n and m are not simultaneously 0, with tetrafluoroethylene, wherein $SO_2F$ groups are converted to $SO_3H$ groups, which has a membrane thickness of from 0.1 to 200 μm, preferably from 1 to 100 μm, is preferably used from the viewpoint of the excellent selective permeability of the acid, the handling efficiency and the availability of the membrane.

Another preferred cation exchange membrane to be used in the present invention is a cation exchange membrane made of a polymer (molecular weight: 5,000–700,000, preferably 10,000–100,000) which consists essentially of aromatic rings and linking groups and which contains in the repeating units a group of the formula (1):

—X—Ar—Y—　(1)

wherein each of X and Y is —O—, —S—, a $C_{1-13}$ alkylene group or a single bond, and Ar is:

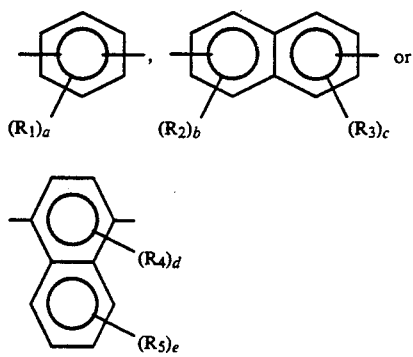

wherein each of $R_1$ to $R_5$ which may be the same or different, is a substituent having a negative Hammett's substituent constant, a is from 0 to 3, and each of b+c and d+e is from 0 to 5, wherein sulfonic acid groups are introduced to the aromatic rings. Such a cation exchanger has aromatic rings in its main chain and thus is excellent in the mechanical properties, heat resistance, chemical resistance and thin film-forming properties.

Preferred examples of the group of the formula (1) are as follows.

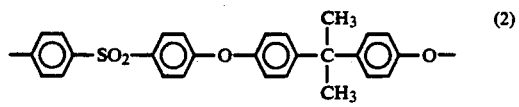

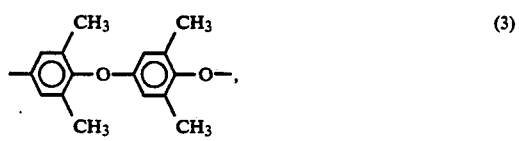

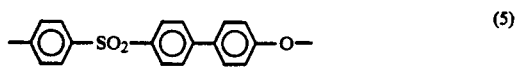

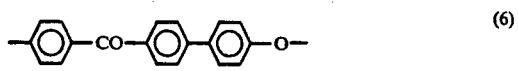

Among them, it is preferred to employ a cation exchange membrane wherein the aromatic polymer is a block copolymer comprising two types of repeating units and sulfonic acid groups are predominantly introduced in the aromatic rings of the one of the repeating units, since it is thereby possible to obtain a membrane having high permeability and selectivity and excellent mechanical properties.

As such a block copolymer, a polyphenylene oxide/-polyethersulfone copolymer, a polyphenylene sulfide/-polyethersulfone copolymer, a polyarylethersulfone/-polyethersulfone copolymer, a polyaryletherarylate/-polyarylate copolymer or a polyarylethersulfone/polythioethersulfone copolymer, may be mentioned. Among them, polymers of the following formulas may be mentioned as preferred block copolymers:

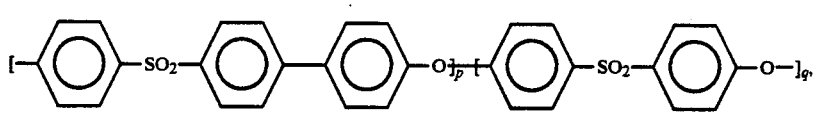

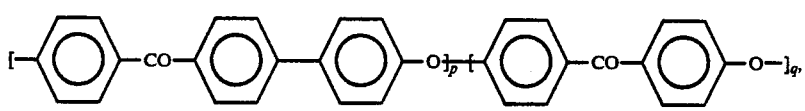

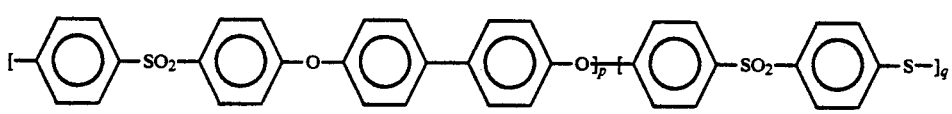

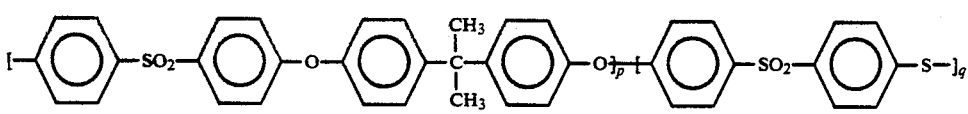

or

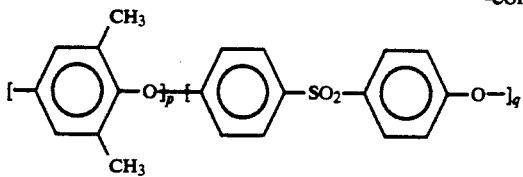

(11)

In the above formulas, each of p and q is from 2 to 200, and p/q is from 0.1 to 100. Such copolymers can be prepared by the methods disclosed in Japanese Unexamined Patent Publications No. 215348/1989, No. 245035/1990 and No. 2484341990 by the present applicant.

The layer of the anion exchanger to be laminated with the above cation exchange membrane in the present invention may be the same type of polymer as the above cation exchanger layer or a different type of polymer such as a styrene-divinylbenzene copolymer. However, it is preferred to employ an anion exchanger made of a polymer which consists essentially of aromatic rings and linking groups and which has in its repeating units a group of the formula (1):

—X—Ar—Y—  (1)

wherein each of X and Y is —O—, —S—, a $C_{1-13}$ alkylene group or a single bond, and Ar is:

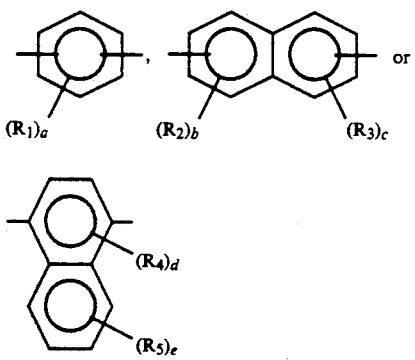

wherein each of $R_1$ to $R_5$ which may be the same or different is a substituent having a negative Hammett's substituent constant, a is from 0 to 3, and each of b+c and d+e is from 0 to 5, wherein anion exchange groups are introduced in the aromatic rings, since the selective permeability and the mechanical properties of the membrane will thereby be excellent. Such an anion exchanger may, for example, be anion exchangers of the polymers represented by the formulas (2) to (6) in which anion exchange groups are introduced to such an extent that the ion exchange capacity would be from 0.5 to 4.5 meq/g dry resin, preferably from 1.0 to 3.5 meq/g dry resin.

In the present invention, it is preferred to employ a polymer which contains in its repeating units a group of the above formula (1) in a block fashion. For example, it is preferred to employ a polyphenylene oxide/polyethersulfone copolymer, a polyphenylene sulfide/polyethersulfone copolymer, a polyarylethersulfone/polyethersulfone copolymer, a polyarylether arylate/polyarylate copolymer or a polyarylethersulfone/polythioethersulfone copolymer. For example, an anion exchange membrane of a polymer of the formula (7), (8), (9), (10) or (11) wherein anion exchange groups are introduced, may be mentioned.

As a method for introducing anion exchange groups to such a polymer, it is possible to employ a method (a) wherein an aminoalkyl group is introduced and if necessary quaternarized by an alkyl halide, or a method (b) wherein a haloalkyl group is introduced, and then a weakly basic anion exchange group of a primary to tertiary amine is introduced by ammonia, a primary or secondary amine, or a strongly basic ion exchange group of a quaternary ammonium salt is introduced by a tertiary amine. Especially the haloalkylation-amination reaction of the method (b) is preferably used, since the reaction is easy, the control of the ion exchange capacity is easy, and introduction of anion exchange groups having different ionic strength is easy, and cross-linkage can be introduced by utilizing the reactivity of the haloalkyl group.

As a method for introducing a haloalkyl group, a reaction such as chlorination or bromination can be used when a polymer having an alkyl group introduced into an aromatic ring is used as the starting material. However, it is usual to introduce such a haloalkyl group selectively into an aromatic ring in the repeating units of the formula —X—Ar—Y—of the block copolymer by a chloromethylation reaction with an electrophilic reactant such as chloromethyl methyl ether, 1,4-bis(-chloromethoxy)butane, 1-chloromethoxy-4-chlorobutane, formalin-hydrogen chloride or paraformaldehyde-hydrogen chloride.

The chloromethylated polymer thus obtained can be formed into an anion exchanger of a membrane form preferably by the following method. (1) The chloromethylated polymer is dissolved, and an amine is added to obtain an anion exchange resin solution, which is cast to form a membrane. (2) The chloromethylated polymer is dissolved and cast to form a membrane, which is then contacted with ammonia or a primary to tertiary amine to convert the remaining chloromethyl groups to anion exchange groups. (3) The chloromethylated polymer is dissolved, then a tertiary amine corresponding to from 1 to 80 mol % of the chloromethyl groups, is added to obtain an anion exchange resin solution, and then the rest of chloromethyl groups is heat-treated and contacted with a Lewis acid or reacted with a polyamine to introduce a cross-linking structure.

The amination agent for introducing anion exchange groups to be used in the present invention, may, for example, ammonia, a primary amine such as methylamine, ethylamine, propylamine, butylamine or ethanolamine, or a secondary amine for example a dialkylamine such as dimethylamine or diethylamine, or diethanolamine.

The tertiary amine for introducing strongly basic ion exchange groups, may, for example, a trialkylamine such as trimethylamine or triethylamine, or triethanolamine. The polyamine for introducing ion exchange groups and cross-linkage, may, for example, an alkylene diamine of the formula $R_6R_7N\text{-}(CH_2)_k\text{—}NR_8R_9$ wherein each of $R_6$, $R_7$, $R_8$ and $R_9$ which may be the same or different, is hydrogen or a $C_{1-6}$ hydrocarbon group, and k is from 1 to 10, such as methylenediamine, ethylenediamine, propylenediamine or hexylenediamine, a polyethyleneimine compound such as diethylenetriamine, triethylenetetramine or tetraethylenepentamine, or an aromatic polyamine such as phenylenediamine.

Thus, the anion exchanger layer of the present invention has a total ion exchange capacity of from 0.5 to 4.5 meq/g dry resin, preferably from 1.0 to 3.5 meq/g dry resin, more preferably from 1.6 to 3.0 meq/g dry resin and a fixed ion concentration of from 4 meq/g water to 30 meq/g water, preferably from 6 meq/g water to 20 meq/g water, and it has a feature that the selectivity and permeability are high. On the surface of such an anion exchanger layer, a cation exchanger layer is provided to form an acid diffusion dialysis membrane of the present invention. As a method for forming such a membrane, there may be employed a method wherein both exchangers are separately formed into films which are then bonded by heating or pressing, a method wherein such films are bonded by a suitable adhesive such as an ion exchange resin solution, a method wherein on a releasable film, a cation exchange resin solution is cast to form a cation exchanger layer, and then an anion exchange resin solution is cast on the cation exchanger layer to form a double layer, or a method wherein a cation exchange resin solution is coated on a preprepared anion exchange film to form a film thereon.

The acid diffusion dialysis membrane thus obtained is preferably such that the thickness of the cation exchanger layer is from 0.01 to 25 μm, preferably from 0.1 to 10 μm, and the thickness of the anion exchanger layer which is larger than that of the cation exchange layer is from 1 to 300 μm, preferably from 10 to 100 μm, and the total membrane thickness is from 1 to 325 μm, preferably from 10 to 125 μm.

The acid diffusion dialysis membrane of the present invention may be reinforced by a porous substrate to improve the dimensional stability and the strength for handling. Such a porous substrate may be embedded in the ion exchanger layer to obtain a reinforced composite ion exchange membrane. Otherwise, a double layer ion exchange membrane comprising a thin layer of ion exchanger and a layer of the porous substrate, may be used to avoid deterioration of the permeability.

The shape of the membrane is not limited to a usual flat shape, and may be an envelope shape, a spiral shape, a hollow fiber structure or a tube structure.

The acid to be separated and recovered by diffusion dialysis using the above ion exchange membrane is an acid having an acid radical with a formula weight of at most 200. The acid having an acid radical with a formula weight of at most 200 may, for example, be an inorganic acid such as HBr, HCl, HClO$_3$, HF, HI, HNO$_3$, H$_2$SO$_4$, H$_3$PO$_4$, HIO$_3$, arsenic acid, H$_2$CrO$_4$ or H$_2$SiF$_6$, or an organic acid such as formic acid, acetic acid or oxalic acid. Among them, from the viewpoint of the permeability of the acid, hydrofluoric acid, hydrochloric acid, nitric acid, sulfuric acid, phosphoric acid, formic acid, acetic acid, oxalic acid or a mixed acid comprising at least two members selected therefrom, which has a formula weight of the anion atomic group of at most 100, is preferably applied.

Impurities in the acid solution in the present invention may, for example, be cations other than hydrogen ions and/or anions. The cations may be metal ions of Group 1A (such as Li, Na or K), 1B (such as Cu, Ag or Au), 2A (such as Mg or Ca), 2B (such as Zn or Cd), 3A (such as Y or La), 3B (such as Al or Ga), 4A (such as Ti or Zr), 4B (such as Sn or Pb), 5A (such as V or Nb), 5B (such as Br), 6A (such as Cr or Mo), 6B (such as Pb), 7A (such as Mn) or 8 (such as Fe, Co, Ni or a platinum group metal). Specifically, cations may be iron, nickel, zinc or aluminum ions. Specific acid solutions containing such impurity cations include a sulfuric acid washing liquor for iron or steel, an acid plating solution for nickel or zinc or an hydrochloric acid etching solution for aluminum.

On the other hand, the anions as impurities in the acid solution may be anions having a formula weight larger than that of the acid radical to be recovered preferably of at least 150 and may be acid radicals of a metal of Group 1B (such as Cu), 2B (such as Zn or Cd), 3B (such as Al or Ga), 4A (such as Ti or Zr), 4B (such as Ge, Sn or Pb), 5A (such as V or Nb), 6A (such as Cr, Mo or W), 6B (such as Se or Te), 7A (such as Mn) or 8 (such as Fe, Co, Ni or a platinum group metal) of the Periodic Table, acid radicals of polyacids (such as isopolyacid or heteropolyacid) or metallic complex anions as well as organic anions such as acid radicals of an organic sulfonic acid having at least 5 carbon atoms or an organic carboxylic acid having at least 8 carbon atoms.

Representative specific examples among them may be acid radicals of a metal acid (metallic oxygen acid) composed of a hydrate of an oxide of a metal of Group 5A, 6A or 6B of the Periodic Table such as vanadic acid, niobic acid, molybdic acid, tungstic acid, selenic acid or telluric acid or isopolyacid or heteropolyacid thereof as well as chloroplatinic acid, chloropalladic acid [Co(NH$_3$)$_2$(NO$_2$)$_4$]$^{-1}$, [Fe(CN)$_6$]$^{-4}$, [Ni(CN)$_4$]$^{-2}$, a chloro complex anion such as FeCl$_6^{-3}$, a fluoro complex anion such as FeF$_6^{-3}$, or an organic anions such as oxalic complex anions or alkylbenzene sulfonic acid radicals. Specific acid solutions containing such anions as impurities may, for example, a hydrochloric acid or hydrofluoric acid washing liquor for steel, a copper-hydrochloric acid solution in the refining of copper, aluminum-oxalic acid solution discharged during the processing of alumite, an oxalic acid waste liquor from the refining of rare metals, or a hydrochloric acid or sulfuric acid waste solution used for the regeneration of a chelate resin.

Thus, when an acid solution having an acid radical with a formula weight of at most 200, which contains impurities, is contacted to the cation exchanger layer side of the diffusion dialysis membrane of the present invention and water or a dilute acid solution is contacted to the other side of the diffusion dialysis membrane, the acid having an acid radical with a formula weight of at most 200 is selectively permeated through the diffusion dialysis membrane while the above cations or anions as impurities in the acid solution will not permeate through the membrane of the present invention, whereby such an acid can selectively be separated and recovered.

The mechanism for the recovery of the acid by the diffusion dialysis membrane in the present invention is not clearly understood, but the recovery is believed to be attributable to the following action. Namely, the cation exchange membrane having sulfonic acid groups is dissociable in an acid solution, whereby permeation of anions can be prevented, but such an action is believed to be dependent on the mass of anions. The cation exchange membrane having a low electrical resistance in the acid solution is excellent in the proton permeability, whereby together with the permeation of protons, anions having a small mass will permeate to maintain the electrical balance, while anions having a large mass can not permeate through the cation exchange membrane. As a result, the acid having an anion with a small mass as a component can selectively be permeated and separated.

The acid dialysis membrane of the present invention composed of the anion exchange membrane having on its surface a cation exchanger layer with strong acidity such as sulfonic acid groups and thus dissociable in an acid solution, whereby permeation of anions can be prevented. Such an action is believed to be dependent on the size of anions. The cation exchanger layer having a small thickness is excellent in the hydrogen ion permeability, whereby together with the permeation of hydrogen ions, small anions will permeate to maintain the electrical balance, while large anions can not permeate through the cation exchanger layer.

On the other hand, cations other than hydrogen ions permeated through the cation exchanger layer can not permeate through the anion exchanger layer. As a result, the acid having a small anion as a component can selectively be permeated and separated.

However, such an explanation is given merely for better understanding of the present invention and should not be interpreted in any way to restrict the present invention.

Now, the present invention will be described with reference to Examples. However, it should be understood that the present invention is by no means restricted by such specific Examples.

EXAMPLE 1

In the same manner as the synthesis disclosed in Japanese Unexamined Patent Publication No. 168629/1986 (U.S. Pat. No. 4,654,410), 4,4'-diphenol and dichlorodiphenylsulfone were reacted to obtain a precursor having an inherent viscosity of 0.22 comprising units of an aromatic polysulfone. Then, the precursor, dichlorodiphenylsulfone and sodium sulfide were reacted to obtain a block copolymer A having an inherent viscosity of 0.65 comprising an aromatic polysulfone and a polythioethersulfone in equimolar amounts.

Then, the copolymer A is reacted with a sulfuric acid anhydride/triethylphosphate complex to obtain a sulfonated copolymer B. From the NMR of the copolymer B, it was confirmed that sulfonic acid groups were selectively introduced into aromatic rings of diphenol. The copolymer B thus obtained, was dissolved in N-methylpyrrolidone, and the solution was cast and dried under heating at 50° C. for two hours to obtain a cation exchange membrane of cast film C having a thickness of 30 $\mu$m. The ion exchange capacity of the cation exchange membrane was 1.9 meq/g dry resin, and the resistance in hydrochloric acid at a concentration of 0.5 mol was 0.05$\Omega$·cm$^2$.

A dialytic cell was divided into two compartments by the cation exchange membrane thus prepared, and in one compartment, a solution containing 7N hydrochloric acid and 0.5M ferric chloride, was filled, and in the other compartment, pure water was filled, whereupon the permeation rates of the acid and iron permeated to the pure water size were obtained.

The permeation rate of the acid was 4.9 mol/m$^2$·hr·$\Delta$c, and as the selectivity, the ratio of the iron permeation rate/acid permeation rate was 0.002.

As compared with the anion exchange membrane (Comparative Example 1), this cation exchange membrane was found to be superior in both the permeability and the selectivity. Here, $\Delta$c represents the difference in the mol concentration.

COMPARATIVE EXAMPLE 1

The copolymer A in Example 1 was chloromethylated and then reacted with trimethylamine to obtain an anion exchange membrane D having a thickness of 25 $\mu$m and an ion exchange capacity of 2.0 meq/g dry resin. The resistance of the membrane D in hydrochloric acid having a concentration of 0.5M was 0.25$\Omega$·cm$^2$.

In the same manner as in Example 1, the performance of the diffusion dialysis was tested with the solution containing 7N hydrochloric acid and 0.5M ferric chloride, whereby the permeation rate of the acid was 0.14 mol/m$^2$·hr·$\Delta$c, and the ratio of the iron permeation rate/acid permeation rate was 0.26.

EXAMPLE 2

In the same manner as in Example 1, the copolymer A and the copolymer B were prepared. Then, the copolymer B was dissolved in N-methylpyrrolidone to obtain a solution C.

On the other hand, the copolymer A was chloromethylated and then reacted with trimethylamine to obtain an anion exchange membrane D having a thickness of 25 $\mu$m and an ion exchange capacity of 2.0 meq/g dry resin. On one side of this anion exchange membrane D, the cation exchange resin solution C was cast and dried under heating at 50° C. for two hours to obtain a double layer ion exchange membrane E having a thickness of 30 $\mu$m.

A dialytic cell was divided into two compartments by the double layer ion exchange membrane E thus obtained. In the compartment facing the cation exchange layer of the membrane E, a solution containing 7N hydrochloric acid, 0.25M ferric chloride and 0.25M ferrous chloride, was filled, and in the other compartment, pure water was filled, whereupon the permeation rates of the acid and iron permeated into the pure water side were obtained. In Table 1, the permeation rate of the acid and the ratio of the iron permeation rate/acid permeation rate were shown. As compared with the Comparative Examples 2 and 3, the double layer ion exchange membrane E was found to be superior in both the permeability and the selectivity.

TABLE 1

|  | Permeation rate of the acid (mol/m$^2$ · hr · $\Delta$c) | Iron permeation rate/ acid permeation rate (ratio) |
| --- | --- | --- |
| Example 2 | 8.0 | 0.02 |
| Comparative Example 2 | 0.3 | 0.11 |
| Comparative Example 3 | 1.5 | 0.01 |

COMPARATIVE EXAMPLE 2

Using the anion exchange membrane D having a thickness of 25 $\mu$m in Example 2, diffusion dialysis was conducted in the same manner as in Example 2, and the results are shown in Table 1. Separately, in the same manner as in the above, the permeation rate of the acid and the permeation rate of iron were obtained with respect to a solution containing 7N hydrochloric acid and 0.5M ferrous chloride, whereby the permeation rate of the acid was 14 mol/m$^2$·hr·Δc, and the ratio of the iron permeation rate/acid permeation rate was 0.008, whereby it is evident that the permeability and the selectivity of the acid deteriorate when trivalent iron is contained in hydrochloric acid.

COMPARATIVE EXAMPLE 3

The cation exchange resin solution C in Example 2 was cast and dried to obtain a cation exchange membrane having a thickness of 25 μm and an ion exchange capacity of 1.9 meq/g dry resin. Diffusion dialysis was conducted in the same manner as in Example 2, and the results are shown in Table 1. Separately, in the same manner as in the above, diffusion dialysis was conducted with respect to the solution containing 7N hydrochloric acid and 0.5M ferric chloride, and the permeation rate of the acid and the permeation rate of the iron were obtained, whereby the permeation rate of the acid was 5.9 mol/m$^2$·hr·Δc, and the ratio of the iron permeation rate/acid permeation rate was 0.002. Thus, it is evident that the selectivity deteriorates when bivalent iron is contained in hydrochloric acid.

EXAMPLE 3

In Example 2, when the cation exchange resin solution C is cast on one side of the anion exchange membrane D having a thickness of 25 μm and an ion exchange capacity of 2.0 meq/g dry resin for double layer formation, the solution C was diluted with methanol to obtain a double layer membrane having a different cation exchanger layer thickness. To the cation exchanger layer side of the double layer membrane thus obtained, a solution containing 7N hydrochloric acid and 0.5M ferric chloride, was supplied, and the permeation rate of the acid and the permeation rate of the iron were obtained in the same manner as in Example 1, and the results are shown in Table 2.

COMPARATIVE EXAMPLE 4

Using the double layer membrane obtained in Example 3, diffusion dialysis was conducted by supplying a solution containing 7N hydrochloric acid and 0.5M ferric chloride to the compartment facing the anion exchanger layer and water to the other compartment, whereby the permeation rate of the acid and the permeation rate of iron were obtained, and the results are shown in Table 2.

TABLE 2

|  | Example 3 | | | | Comparative Example 4 | | | |
|---|---|---|---|---|---|---|---|---|
| Thickness of the cation exchange layer | 2 | 0.5 | 0.1 | 0.05 | 2 | 0.5 | 0.1 | 0.05 |
| Permeation rate of the acid | 6.8 | 6.2 | 8.2 | 5.2 | 0.4 | 2.4 | 1.7 | 1.1 |
| Ratio of iron permeation rate/ Acid permeation rate | 0.05 | 0.08 | 0.06 | 0.01 | 0.23 | 0.11 | 0.24 | 0.39 |

EXAMPLE 4

On one side of Selemion DSV manufactured by Asahi Glass Company Ltd. (anion exchange membrane of a styrenedivinylbenzene copolymer, thickness: 120 μm, ion exchange capacity: 2.0 meq/g dry resin), the cation exchange resin solution C in Example 2 was cast to form a cation exchange layer having a thickness of 0.5 μm. The double layer membrane thus obtained was used and diffusion dialysis of a hydrochloric acid/ferric chloride solution was conducted in the same manner as in Example 3, whereby the permeation rate of the acid was 3.5 mol/m$^2$·hr·Δc, and the ratio of the iron permeation rate/acid permeation rate was 0.06. On the other hand, in a case where the cation exchange layer was not formed, as a comparative example, the permeation rate of the acid was 2.2 mol/m$^2$·hr·Δc and the ratio of the iron permeation rate/acid permeation rate was 0.4.

EXAMPLE 5

Using the double layer membrane having a cation exchange layer with a thickness of 0.1 μm obtained in Example 3, diffusion dialysis was conducted by supplying a solution containing 7N sulfuric acid and 1 g/l of molybdic acid to the compartment facing the cation exchanger layer, and the permeation rate of the acid was measured and found to be 6 mol/m$^2$·hr·Δc. On the other hand, for the purpose of comparison, diffusion dialysis was conducted in the same manner by using an anion exchange membrane D having the cation exchanger layer obtained in Example 1 not laminated, whereby the permeation rate of the acid was 0.2 mol/m$^2$·hr·Δc. As a result, it is evident that the decrease in the permeation rate of molybdic acid, can be improved by the lamination of the cation exchanger layer.

EXAMPLE 6

A dialytic cell was divided into two compartments by the same diffusion dialytic membrane as used in Example 1. Then, a solution containing 1.4N oxalic acid and 0.4M aluminum, was filled in the compartment facing the cation exchange layer side, and pure water was filled in the other compartment, whereupon the permeation rates of the acid and aluminum permeated to the pure water side were obtained. In Table 3, the permeation rate of the acid and as the selectivity, the ratio of the aluminum permeation rate/acid permeation rate were shown.

It is evident that as compared with a comparative anion exchange membrane, this cation exchange membrane is superior in both the permeability and the selectivity.

COMPARATIVE EXAMPLE 5

Using the anion exchange membrane D having a thickness of 25 μm and an ion exchange capacity of 2.0 meq/g dry resin in Comparative Example 1, diffusion dialysis was conducted in the same manner as in Example 6 with respect to the solution containing 1.4N oxalic acid and 0.4M aluminum, and the results are shown in Table 3.

COMPARATIVE EXAMPLE 6

Using Selemion DSV manufactured by Asahi Glass Company Ltd. (anion exchange membrane of a styrenedivinylbenzene copolymer, thickness: 120 μm, ion exchange capacity: 2.0 meq/g dry resin), diffusion dialysis was conducted in the same manner as in Example 6 with respect to the solution containing 1.4N oxalic acid and 0.4M aluminum, and the results are shown in Table 3.

TABLE 3

|  | Permeation rate of oxalic acid (mol/m² · hr · Δc) | Aluminum permeation rate/oxalic acid permeation rate (ratio) |
|---|---|---|
| Example 6 | 11.5 | 0.001 |
| Comparative Example 5 | 1.1 | 0.5 |
| Comparative Example 6 | 0.7 | 0.7 |

According to the present invention, a practical recovery process of an acid can be provided even for a recovery system wherein recovery of an acid was practically impossible as a result of deterioration of the permeation properties and/or the selectivity in the presence of anions or cations as impurities in the acid diffusion dialysis by conventional anion exchange membranes, and it is thereby possible to preserve the environment and to effectively utilize the resources.

We claim:

1. A method for separating and recovering an acid, which comprises contacting to one side of a diffusion dialysis membrane an acid solution containing an acid having an acid radical with a formula weight of at most 200 and impurities and to the other side of the membrane water or a dilute acid solution, to separate and recover the acid in the solution, wherein a cation exchange membrane containing sulfonic acid groups in an amount of from 0.5 to 4.5 meq/g dry resin and having an electrical resistance of at most 0.5 Ω/cm² as measured in the acid solution containing the acid to be recovered at a concentration of 0.5 mol/l, is used as the diffusion dialysis membrane and wherein the impurities are anions and acid radicals of an acid of a metal of Group 1B, 2B, 3, 4A, 4B, 5A, 6, 7A or 8 or the Periodic Table or metallic complex anions thereof.

2. The method for separating and recovering an acid according to claim 1, wherein the acid having an acid radical with a formula weight of at most 200 is hydrofluoric acid, hydrochloric acid, nitric acid, sulfuric acid, phosphoric acid, formic acid, acetic acid, oxalic acid or a mixed acid comprising at least two members selected therefrom.

3. A method for separating and recovering an acid, which comprises contacting to one side of a diffusion dialysis membrane an acid solution containing an acid having an acid radical with a formula weight of at most 200 and impurities and to the other side of the membrane water or a dilute acid solution, to selectively permeate the acid from the acid solution, wherein the diffusion dialysis membrane comprises a main layer of an anion exchanger and a layer of a cation exchanger formed on the main layer at the side which is in contact with the acid solution and wherein the impurities are anions and acid radicals of an acid of a metal of Group 1B, 2B, 3, 4A, 4B, 5A, 6, 7A, or 8 of the Periodic Table or metallic complex anions thereof.

4. The method for separating and recovering an acid according to claim 3, wherein the layer of a cation exchanger is a layer of a cation exchanger having sulfonic acid groups and having an ion exchange capacity of from 0.5 to 4.0 meq/g dry resin and a thickness of from 0.01 to 25 μm.

5. The method for separating and recovering an acid according to claim 4, wherein the layer of a cation exchanger is a layer of a cation exchanger made of a polymer which consists essentially of aromatic rings and linking groups and which contains in its repeating units a group of the formula (1):

$$-X-Ar-Y- \qquad (1)$$

wherein each of X and Y is —O—, —S—, a $C_{1-13}$ alkylene group or a single bond, and Ar is:

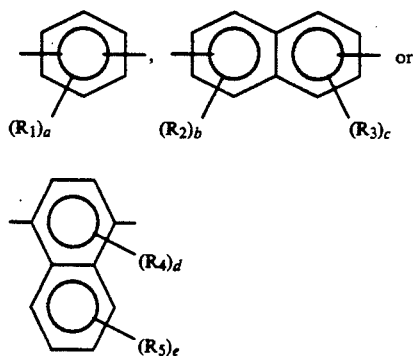

wherein each of $R_1$ to $R_5$ which may be the same or different, is a substituent having a negative Hammett's substituent constant, and a is from 0 to 3, and each of b+c and d+e is from 0 to 5, wherein sulfonic acid groups are introduced in the aromatic rings.

6. The method for separating and recovering an acid according to claim 3, wherein the layer of a cation exchanger is a layer of a cation exchanger made of a copolymer of $CF_2=CF(OCF_2CFCF_3)_mO(CF_2)_nSO_2F$ wherein n is from 0 to 2 and n is from 0 to 4, provided m and n are not simultaneously 0, with tetrafluoroethylene, wherein $SO_2F$ groups are converted to $SO_3H$ groups.

7. The method for separating and recovering an acid according to claim 3, wherein the main layer of an anion exchanger is a layer of an anion exchanger made of a polymer which contains in its repeating units a group of the formula (1):

$$-X-Ar-Y- \qquad (1)$$

wherein each of X and Y is —O—, —S—, a $C_{1-13}$ alkylene group or a single bond, and Ar is:

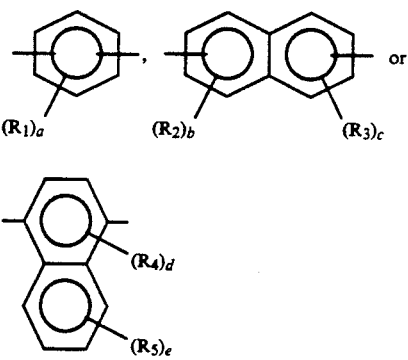

wherein each of $R_1$ to $R_5$ which may be the same or different, is a substituent having a negative Hammett's substituent constant, and a is from 0 to 3, and each of b+c and d+e is from 0 to 5, wherein anion exchange groups are introduced in the aromatic rings, and having an ion exchange capacity of from 0.5 to 4.5 meq/g dry resin.

8. The method for separating and recovering an acid according to claim 3, wherein the thickness of the main layer of the anion exchanger is from 1 to 100 μm, and the total membrane thickness is from 1 to 125 μm.

9. The method for separating and recovering an acid according to claim 3, wherein the acid having an acid radical of a formula weight of at most 200 is hydrofluoric acid, hydrochloric acid, nitric acid, sulfuric acid, phosphoric acid, formic acid, acetic acid, oxalic acid or a mixed acid comprising at least two members selected therefrom.

* * * * *